United States Patent [19]

Turner

[11] Patent Number: 4,905,249

[45] Date of Patent: Feb. 27, 1990

[54] CATALYTIC CONVERTER

[75] Inventor: Robert Turner, St. James, N.Y.

[73] Assignee: Applied Photonics, Inc., Hauppauge, N.Y.

[21] Appl. No.: 294,465

[22] Filed: Jan. 6, 1989

[51] Int. Cl.[4] .............................................. H01S 3/22
[52] U.S. Cl. ......................................... 372/59; 372/55
[58] Field of Search ............................. 372/55, 58, 59

[56] References Cited

U.S. PATENT DOCUMENTS

| 4,188,592 | 2/1980 | Buczek et al. | 378/59 |
| 4,196,400 | 4/1980 | Martin | 372/59 |
| 4,629,611 | 12/1986 | Fan | 372/59 |
| 4,723,254 | 2/1988 | Turner | 378/59 |
| 4,815,092 | 3/1989 | Charther | 372/59 |

Primary Examiner—Léon Scott, Jr.
Attorney, Agent, or Firm—Roberts, Spiecens & Cohen

[57] ABSTRACT

A closed loop carbon dioxide laser system includes a catalytic converter in the form of a conduit with an annular recess which is filled with a catalyst of platinum-plated alumina pellets that are externally heated.

6 Claims, 2 Drawing Sheets

CATALYTIC CONVERTER

BACKGROUND OF THE INVENTION

This invention pertains to catalytic converters and more particularly to such converters for use in laser systems. In gas laser systems the lasing action causes chemical reactions of the gases resulting in deterioration of the lasing materials. For example, in lasers using carbon dioxide as the lasing material the gas breaks down to carbon monoxide and oxygen. In order for the action to continue it is necessary to replenish the carbon dioxide. The replenishment is normally done by passing the oxygen through a catalytic converter which causes the carbon monoxide and oxygen to combine to form carbon dioxide.

The presently available converters are of two types. The first type is a tube filled with catalyst such as platinum coated pellets with the tube raised to a high temperature. The spent gasses from the laser system are forced through the tube. Such an approach results with almost 100% catalytic efficiency but with a great pressure drop in the gas. Thus added pumps are required to obtain the desired gas pressures. The second type is an array of thin concentric cylinders where each cylinder is a metal plated with platinum. The spent gasses must be preheated before passage through the array and cooled after exit from the array. Not only is it necessary to go through the added expense of heaters and coolers but the catalytic efficiency of the array is considerably less than 100%.

BRIEF SUMMARY OF THE INVENTION

It is accordingly a general object of the invention to provide means and method for catalytic conversion.

It is another object of the invention to provide catalytic conversion of high efficiency at a lower cost and complexity than presently known devices.

Briefly the invention contemplates passing the spent gasses through a conduit wherein an inner portion thereof has annularly disposed thereabouts a heated catalyst. The catalyst being preferably pellets of platinum coated alumina.

According to a feature of the invention means are provided to add turbulence to the gasses flowing through the conduit.

BRIEF DESCRIPTION OF THE DRAWING

Other objects, features and advantages of the invention will be apparent from the following detailed description of the invention when read in conjunction with the accompanying drawing which shows the presently preferred embodiment of the invention.

In the drawing.

DETAILED DESCRIPTION OF THE PREFERRED EMBODIMENT

Figure 1:
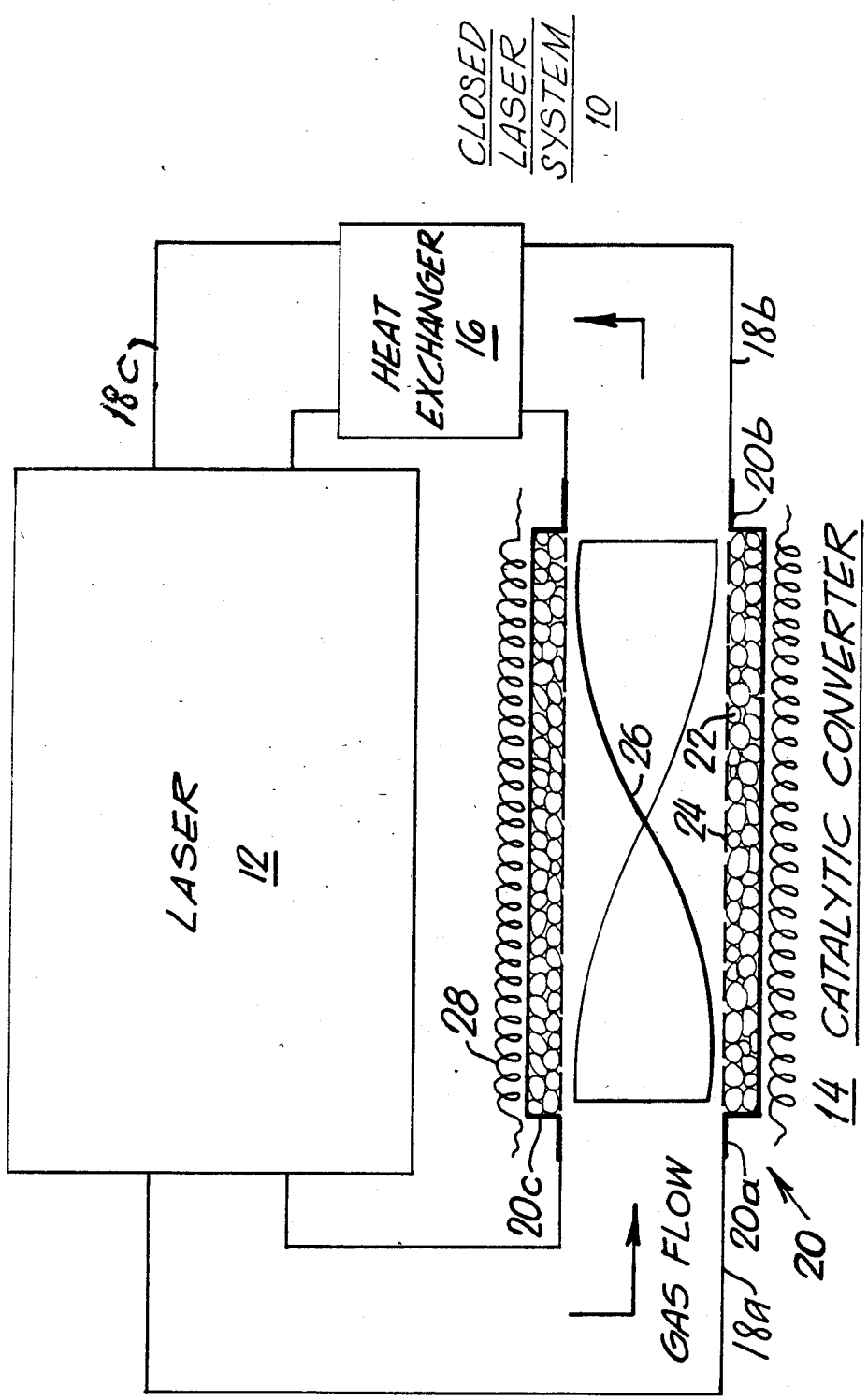
FIG. 1 is a cross-sectional view of the catalytic converter in accordance with the invention.

In FIG. 1 there is shown a closed laser system 10 including a carbon dioxide laser 12, a catalytic converter 14 and a heat exchanger 16. These elements are interconnected by conduits 18 to form a closed loop. The gasses in the system are driven in a counter clockwise direction by blowers (not shown). The laser 12, in the course of generating coherent light, chemically converts the carbon dioxide to oxygen and carbon monoxide. These gasses ae driven via conduit 18a through catalytic converter 14 where the oxygen and carbon monoxide are recombined to carbon dioxide. The carbon dioxide passes, via conduit 18b, through heat exchanger 16 for cooling before being fed back via conduit 18c to laser 12.

Figure 2:
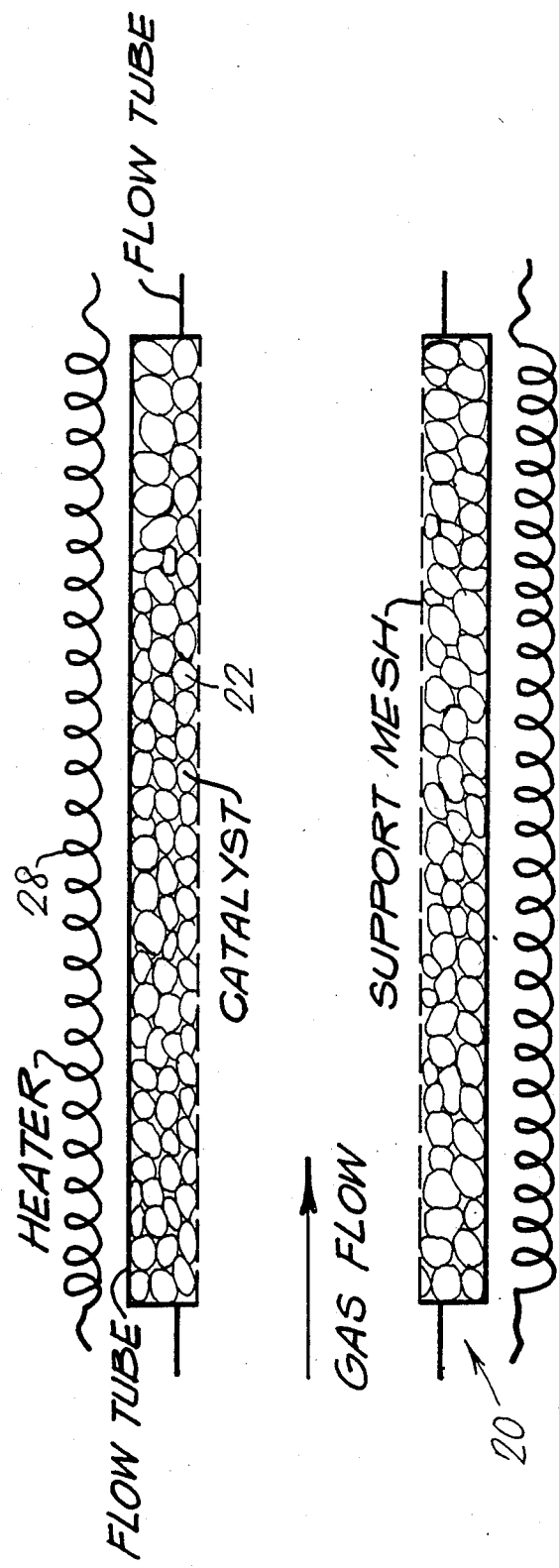
FIG. 2 is a cross-sectional view of an alternate embodiment of the invention.

Laser 12 is a conventional carbon dioxide laser. Similarly the heat exchanger 16 is conventional. The catalytic converter 14 includes a conduit 20 having ends 20a and 20b respectively coupled to conduits 18a and 18b. The central portion of the conduit 20 is provided with an annular recess 20c. The recess is filled with a catalyst 22 which is preferably pellets of platinum coated alumina. The recess 20a is covered with a wire mesh 24 which can be platinized to contain the pellets. The mesh can be coextensive with the inner wall of conduit 20 as shown in FIG. 1 or extend inward of the inner wall as in FIG. 2 to act as a turbulator of the flowing gas. In the embodiment of FIG. 1 the turbulator of the flowing gas. In the embodiment of FIG. 1 the turbulence is induced by a helical vane 26. The catalyst is heated by heater 28 annularly disposed about the outer wall of the recess.

In a stable state of operation the laser can tolerate a minor percentage of oxygen. The flow rate of the gasses, the cross-sectional area of the conduit, the axial extent of catalyst filled recess, and the degree of turbulence can be varied to obtain the desired percentage of oxygen.

While only a limited number of embodiments of the invention have been shown and described in detail there will now be obvious to those skilled in the art many modifications and variations satisfying the objects of the invention without departing from the spirit thereof as defined by the appended claims.

What is claimed is:

1. A closed-loop carbon dioxide laser system comprising: a carbon dioxide laser; a heat exchanger; a catalytic converter comprising a conduit means for conducting a gas, a catalysing means, said catalysing means having an annular recess in said conduit means, a plurality of pellets of platinum-plated alumina in said annular recess and porous means for containing said pellets in said annular recess, a heating means, for heating said catalysing means and turbulating means for deflections a portion of the gas towards said catalysing means; and conduit means for interconnection of said laser, said heat exchanger and said catalytic converter in a closed loop.

2. The catalytic converter of claim 1 wherein: said catalysing means is annularly disposed about the inner wall of said conduit means and extends along a portion of the length of said conduit means so that the pressure drop in said conduit means is small.

3. The catalytic converter of claim 1 wherein said turbulating means comprises a portion of said catalysing means extending inwardly from said inner wall of said conduit means.

4. The catalytic converter of claim 1 wherein said heating means is an electrical heater annularly disposed about said catalysing means.

5. The method of converting a mixture of carbon monoxide and oxygen to carbon dioxide in a carbon dioxide laser system comprising: the steps providing a conduit having one end for receiving the mixture and another end for delivering at least carbon dioxide; providing in said conduit a plurality of platinum-coated alumina pellets annularly disposed about the inner wall of said conduit; and heating said pellets.

6. The method of claim 5 further comprising the step of turbulating the mixture in said conduit.

* * * * *